No. 872,752. PATENTED DEC. 3, 1907.
P. M. RULLI & P. PEPE.
NUT LOCK.
APPLICATION FILED AUG. 1, 1907.

Witnesses
Samuel Payne
K. H. Butler

Inventors
P. M. Rulli and
P. Pepe.

By
Attorneys

UNITED STATES PATENT OFFICE.

PETER M. RULLI AND PHILLIP PEPE, OF NEW HAVEN, PENNSYLVANIA.

NUT-LOCK.

No. 872,752.  Specification of Letters Patent.  Patented Dec. 3, 1907.

Application filed August 1, 1907. Serial No. 386,614.

*To all whom it may concern:*

Be it known that we, PETER M. RULLI and PHILLIP PEPE, citizens of the United States of America, residing at New Haven, in the county of Fayette and State of Pennsylvania, have invented certain new and useful Improvements in Nut-Locks, of which the following is a specification, reference being had therein to the accompanying drawing.

This invention relates to nut locks, and its object is to provide effective means for preventing the loosening of a nut after it has been secured upon a bolt.

The invention consists in the combination with a bolt of novel construction, of a nut fitting upon said bolt, and a locking device comprising a sleeve or cap having an integral screw.

The construction of the improvement will be fully described hereinafter in connection with the accompanying drawing which forms a part of the specification, and its novel features will be defined in the appended claims.

Figure 1:
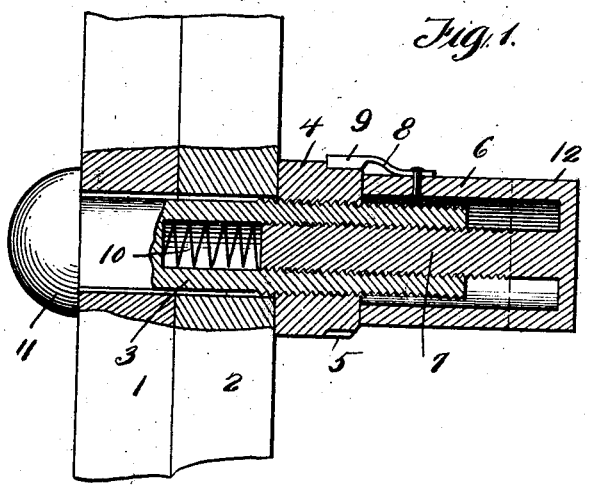
Figure 2:
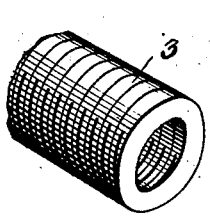
Figure 3:
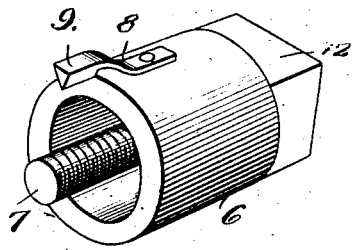
Figure 4:
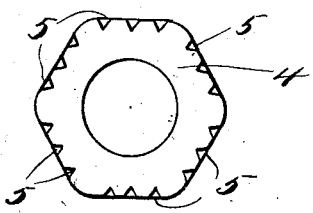

In the drawing, Figure 1 is a sectional elevation of a nut lock embodying the invention, Fig. 2 is a view in perspective of the threaded end of the bolt, Fig. 3 is a perspective view of the locking sleeve or cap, and Fig. 4 is an elevation of the notched nut employed.

The reference numerals 1 and 2 designate two sections of material, or plates of metal to be connected together, formed with registering openings to receive a hollow bolt 3, said bolt being threaded both internally and externally as shown. After the bolt 3 has been inserted, a nut 4 is fitted thereon, said nut having peripheral notches 5.

The locking device comprises a cap-nut 6, closed at its outer end, and provided with an integral screw 7, of a length to project beyond the open end of the cap-nut which engages the internal threads of the hollow bolt 3. The internal threads of the bolt are of opposite pitch to the external threads as illustrated in Fig. 1. Secured to the sleeve 6 near the inner end thereof is a flat spring 8, the free end 9 of which is beveled to adapt it to engage the notches of the nut 4. A coil spring 10 is interposed between the head 11 of the bolt, and the free end of the screw 7; this spring serves owing to its tension being exerted against the end of screw 7 to press the threads thereof into engagement with the internal threads of the bolt 3 so as to have a tendency to hold the cap nut at any time when the lug 9 is not engaged with the nut 4. The outer end 12 of the cap-nut 6 is squared to adapt it to be removed by the application of a wrench.

The utility and operation of the device will be readily understood from the drawing and foregoing description.

Having now described our invention, what we claim as new, is:—

In a nut lock, a bolt having an externally threaded shank and an internally threaded bore, a nut fitting on the external threads of the bolt and having peripheral notches at its outer end, a cap-nut inclosing the outer end of said bolt and abutting against the outer face of said nut, an interior screw integral with the closed end of the cap-nut and projecting beyond the open inner end of said cap-nut and engaging the internal threads of said bolt, and a spring secured at one end to the periphery of said cap-nut and having its free end overlapping the said nut and engaging in one of said notches.

In testimony whereof we affix our signatures in the presence of two witnesses.

PETER M. RULLI.
PHILLIP PEPE.

Witnesses:
G. FREEMAN STILLWAGON,
A. W. HART.